United States Patent
Denbar et al.

(10) Patent No.: US 7,355,988 B1
(45) Date of Patent: Apr. 8, 2008

(54) APPLICATION SERVER HAVING ASYNCHRONOUS EVENT MANAGER CONFIGURED FOR TERMINATING MESSAGING OPERATIONS AND ROLLING BACK PRESCRIBED DATA STRUCTURES

(75) Inventors: Melissa Lee Denbar, Glen Allen, VA (US); William Bateman Willaford, IV, Richmond, VA (US); James Marion Coulthard, Gordonsville, VA (US); Brian Thomas Burnett, Glen Allen, VA (US)

(73) Assignee: Cisco Technology, Inc., San Jose, CA (US)

( * ) Notice: Subject to any disclaimer, the term of this patent is extended or adjusted under 35 U.S.C. 154(b) by 1037 days.

(21) Appl. No.: 09/800,476

(22) Filed: Mar. 8, 2001

(51) Int. Cl.
*H04B 1/44* (2006.01)
*H04L 12/28* (2006.01)
*H04L 12/56* (2006.01)
*H04M 11/00* (2006.01)

(52) U.S. Cl. .................. 370/282; 370/395.2; 370/401; 379/88.13

(58) Field of Classification Search ............... 370/252, 370/282, 352–356, 389, 392, 395.2–395.21, 370/522, 526, 401; 379/88.13, 265.09, 266.02, 379/902, 256.09
See application file for complete search history.

(56) References Cited

U.S. PATENT DOCUMENTS

| | | | |
|---|---|---|---|
| 4,837,798 A | | 6/1989 | Cohen et al. |
| 5,422,936 A | * | 6/1995 | Atwell ..................... 379/88.23 |
| 5,448,626 A | * | 9/1995 | Kajiya et al. ............. 379/88.13 |
| 5,519,768 A | | 5/1996 | Moquin et al. |
| 5,544,234 A | * | 8/1996 | Terajima et al. ....... 379/100.16 |
| 5,594,783 A | * | 1/1997 | Ito ............................... 379/68 |
| 5,943,400 A | * | 8/1999 | Park .......................... 379/88.22 |
| 6,463,053 B1 | * | 10/2002 | Chen .......................... 370/352 |
| 6,480,586 B1 | * | 11/2002 | Hayes et al. ........... 379/102.02 |
| 6,529,500 B1 | * | 3/2003 | Pandharipande ............ 370/352 |
| 6,546,085 B1 | * | 4/2003 | Brockman et al. ....... 379/88.13 |
| 6,636,587 B1 | * | 10/2003 | Nagai et al. ............. 379/88.14 |
| 6,654,452 B1 | * | 11/2003 | Murray et al. .............. 379/197 |
| 6,775,249 B1 | * | 8/2004 | Gibson et al. .............. 370/296 |
| 6,785,379 B1 | * | 8/2004 | Rogers et al. ......... 379/265.02 |
| 2003/0002476 A1 | * | 1/2003 | Chung et al. ............... 370/352 |

(Continued)

*Primary Examiner*—Wing Chan
*Assistant Examiner*—Gregory Sefcheck
(74) *Attorney, Agent, or Firm*—Leon R. Turkevich (57) ABSTRACT

An application server includes an asynchronous event manager configured for selectively terminating an instance executing a messaging session, based on detecting a message from a gateway server that the incoming call is a call having a type that differs from the prescribed type intended for the messaging session. The asynchronous event manager terminates the instance by setting global variables accessible by the instance that specify that the call is rejected (i.e., the connection between the gateway and the instance executing the messaging session is terminated) due to the incoming call being of a different type than intended for that messaging session, for example the call being a fax call instead of a voice call. The instance executing the messaging session checks the global variables prior to committing to execution of critical operations that affect stored subscriber messaging data, for example before sending a recorded message for storage, or changing a state of a stored message from a new message to a stored message or deleted message. If the global variables indicate that the messaging session should be terminated, the instance rolls back the necessary data structures by deleting any necessary data (e.g., log entries, application state information, recorded messages, etc.), and terminates the instance.

44 Claims, 4 Drawing Sheets

U.S. PATENT DOCUMENTS

2003/0095542 A1* 5/2003 Chang et al. ............... 370/352
2003/0193696 A1* 10/2003 Walker et al. .............. 358/402
2003/0194074 A1* 10/2003 Newlin .................. 379/211.01

* cited by examiner

APPLICATION SERVER HAVING ASYNCHRONOUS EVENT MANAGER CONFIGURED FOR TERMINATING MESSAGING OPERATIONS AND ROLLING BACK PRESCRIBED DATA STRUCTURES

BACKGROUND OF THE INVENTION

1. Field of the Invention

The present invention relates to selective termination of messaging operations in a unified messaging system configured for receiving incoming calls as voice message calls or incoming fax calls.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure. Hence, the reliance on proprietary protocols and closed development environments by telecommunications equipment providers has limited service providers to vendor-specific implementations of voice and telephony services.

Voice over IP technology is under development as part of an alternative open packet telephony communications network, distinct from the public (circuit switched) telephone network, capable of using packet switched networks for integrating voice, data, facsimile, and Internet services, and the like. New packet telephony voice services are being built from open standards such as The International Telecommunications Union (ITU) Recommendation H.323. Recommendation H.323 defines the components, procedures, and protocols necessary to provide audiovisual communications on local area networks. Recommendation H.323 is based on the Real Time Protocol/Control Protocol (RTP/RTCP) of the Internet Engineering Task Force (IETF), and applies to either point-to-point or multipoint sessions, and references many other ITU recommendations, including H.225 and H.245. Recommendation H.225 specifies messages for call control including signaling, registration and admissions, and packetization/synchronization of media streams. Recommendation H.245 specifies messages for opening and closing channels for media streams, and other commands, requests and indications.

One problem encountered with unified messaging is the inability of a messaging application to distinguish between an incoming voice call and an incoming facsimile call for a unified messaging subscriber before initiating a voice messaging session. For example a gateway such as the Cisco AS5300 Universal Access Server, configured for receiving incoming calls (e.g., according to voice over IP protocol), may send a request to an application server to initiate a voice messaging session based on the assumption that the incoming call is from a calling party desiring to leave a voice message; however if the incoming call is from a fax machine, the gateway may not detect the facsimile machine tones for up to seven seconds after detecting the incoming call. Hence, different error conditions may occur if the fax machine interacts with the voice messaging session executed by the application server, depending on the programming of the voice messaging session: for example, the application server executing the voice messaging session could store the fax tones as a recorded message; the incoming fax call also could adversely affect the status of stored new messages if the messaging application is configured for message autoplayback, where new messages are played during the incoming fax call and redesignated as stored messages, adding further inconvenience to the messaging subscriber.

Hence, a gateway is unable to effectively distinguish between an incoming voice call and a fax call before sending a request to the application server to initiate the voice messaging session. In addition, delaying initiation of the voice messaging session while the gateway determines whether the incoming call is a fax call is not an acceptable alternative, since the calling party would then need to wait an unacceptably long interval before leaving a voice message. Hence, developers of messaging applications may be reluctant to provide advanced features due to concerns of an incoming fax call adversely affecting a messaging application. Limiting incoming fax calls to prescribed telephone numbers configured for connecting the incoming fax calls to a fax server also requires the use of multiple telephone numbers for a single subscriber, and limits the flexibility of unified messaging for a messaging subscriber.

SUMMARY OF THE INVENTION

There is a need for an arrangement that enables a unified messaging system to initiate messaging sessions for incoming calls, independent of call type, while preventing erroneous storage of messages due to incompatible call types, for example storage of fax tones in a voice messaging system.

There also is a need for arrangement that enables an instance of an application process, initiated in response to a request from a gateway configured for receiving an incoming call, to be terminated without adversely affecting a state of a subscriber's message store, for example the erroneous retrieval of messages, or storage of voice-type messages storing fax tones.

These and other needs are attained by the present invention, where an application server, configured for initiating and executing a messaging session for an incoming call, received by a gateway server, includes an asynchronous event manager configured for selectively terminating the instance executing the messaging session, based on detecting a message from the gateway server that the incoming call is a call having a type that differs from the prescribed type intended for the messaging session. The asynchronous event manager terminates the instance by setting global variables accessible by the instance that specify that the call is rejected (i.e., the connection between the gateway and the instance executing the messaging session is terminated) due to the incoming call being of a different type than intended for that messaging session, for example the call being a fax call instead of a voice call. Hence, the asynchronous event manager sets the global variables independent of the execution state of the instance. The instance executing the messaging session checks the global variables prior to committing to execution of critical operations that affect stored subscriber messaging data, for example before sending a recorded message for storage, or changing a state of a stored message from a new message to a stored message or deleted message. Typically the instance is configured for checking the global variables only after the gateway has had sufficient time to determine the type of call being received. If the instance determines from the global variables that the critical operations may be performed, the instance commits to execution of the critical operations; however, if the global variables are set by the asynchronous event manager to indicate that the messaging session should be terminated, the instance rolls back the necessary data structures by deleting any necessary data (e.g., log entries, application state information, recorded messages, etc.), and terminates the instance. Hence, the asynchronous event manager enables multiple instances to be initiated for a single call while the gateway determines the call type, at which point the unnecessary instances can be terminated without adversely affecting critical data structures.

One aspect of the present invention provides a method in an application server. The method includes initiating an instance of an application process in response to reception of an initiation request. The application process is configured for executing a prescribed sequence of messaging operations for a first type of incoming message. During the initiating step first data is written into a first data structure that identifies information based on execution of the instance. The method also includes selectively terminating the instance based on detecting, at a prescribed location in the prescribed sequence, a prescribed variable set during execution of the instance and that specifies the prescribed sequence of message operations are not to be performed. The selectively terminating step includes terminating execution of the operations subsequent to the prescribed location and removing the first data from the first data structure.

Another aspect of the present invention provides a method in a communications system having a gateway configured for receiving incoming calls and an application server. The method includes sending a request by the gateway to the application server for initiating a messaging session according to a first message type in response to receiving an incoming call. The application server initiates an instance of an application process configured for executing a prescribed sequence of messaging operations for generation of the messaging session, and writes first data into a first data structure that identifies information based on execution of the instance. The gateway, in response to detecting that the incoming call corresponds to a second message type incompatible with the first message type, sends a reject message to the application server. The application server terminates the instance in response to the reject message, prior to completion of executing the prescribed sequence of messaging operations, including removing the first data from the first data structure.

Still another aspect of the invention provides an application server that includes an interface, and an application runtime environment. The interface is configured for receiving messages from a gateway configured for receiving incoming calls. In particular, the gateway is configured for outputting a first request for initiating a messaging session according to a first message type in response to receiving the incoming call. The gateway also is configured for outputting a reject message in response to detecting that the incoming call corresponds to a second message type incompatible with the first message type. The application runtime environment is configured for initiating an instance of an application process, configured for executing a prescribed sequence of messaging operations for the first type of incoming message, in response to reception of the first request, the instance writing first data into a first data structure that identifies information based on execution of the instance. The application runtime environment includes an asynchronous event manager configured for selectively terminating the instance based on detecting the reject message by a prescribed location in the prescribed sequence. The asynchronous event manager terminates execution of the operations subsequent to the prescribed location, and removes the first data from the first data structure.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment is directed to a fault-tolerant unified messaging system that enables initiation of messaging sessions for incoming callers, regardless of the incoming call type. In particular, a gateway such as a voice-over-IP gateway or a gateway serving as an interface between a telephony-based private branch exchange (PBX) and an application server, is configured for receiving an incoming call. The incoming call may be a voice call for a user attempting to call a messaging subscriber; alternatively the incoming call may be an incoming fax call from a fax machine for a subscriber that utilizes the called number for voice calls and fax messages. In response to the incoming call, the gateway sends requests to the appropriate messaging servers for initiation of messaging sessions for respective message types. The gateway simultaneously supports the multiple messaging sessions while determining the message type. Once the gateway determines the message type on the incoming call (e.g., DTMF digit indicating user-based call or fax tones indicating a fax call), the gateway sends a reject message to the messaging sessions to be terminated due to their respective incompatible message types, and maintains the one messaging session having the matching message type. The application server, upon receiving the reject message, rolls back the necessary data structures such as event logs and events (i.e., deletes data from data structures) to the state prior to initiation of the messaging session, and terminates the instance executing the messaging session prior to execution of critical functions that are nonrecoverable.

Hence, the disclosed arrangement enables multiple instances to be simultaneously initiated for respective message types to optimize throughput, followed by termination of non-relevant instances once the message type of the incoming call has been determined. A description will first be given of the unified messaging architecture used to provide unified messaging services for subscribers, followed by a detailed description of the arrangement for managing multiple instances of messaging sessions by selectively terminating an instance based on detecting a reject signal from the gateway.

Figure 1:
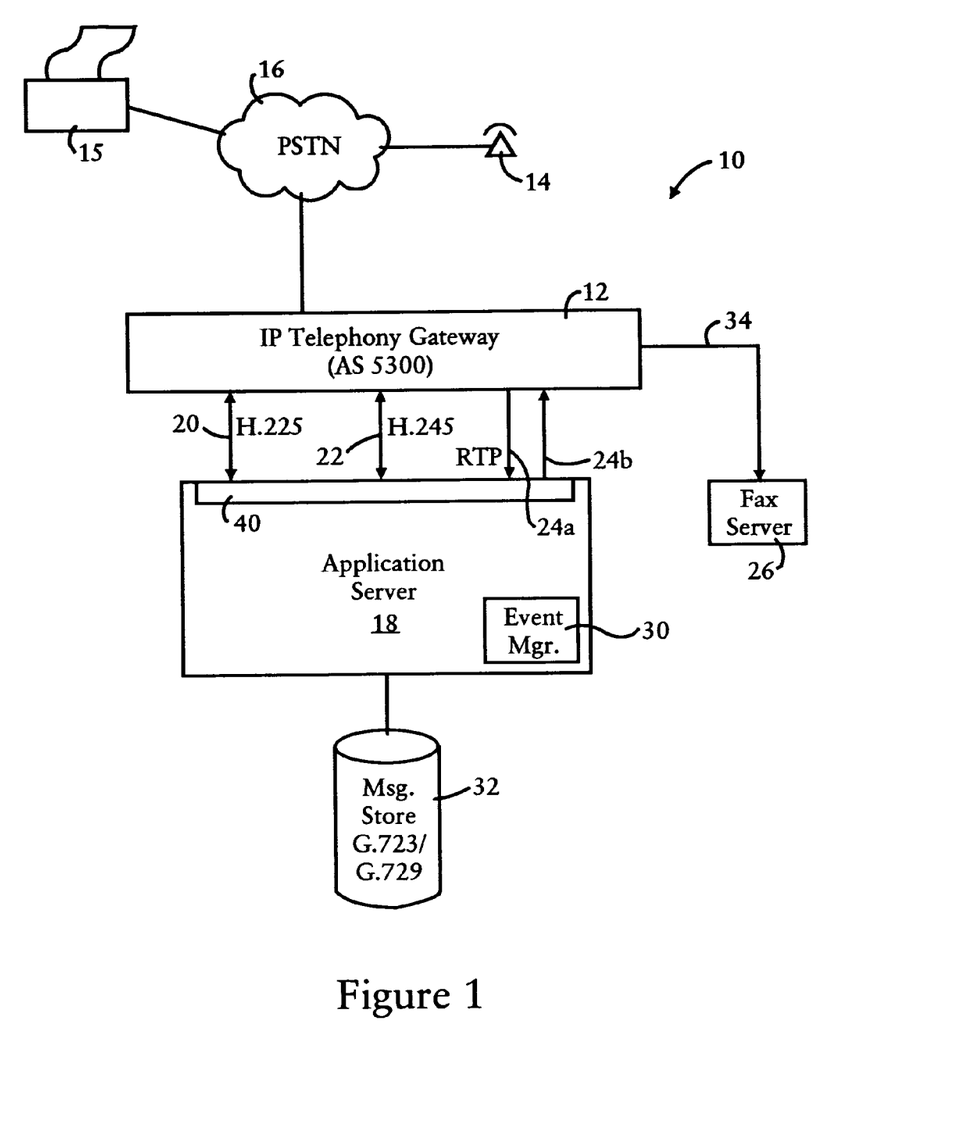
FIG. 1 is a block diagram illustrating a communications system having a gateway configured for receiving incoming calls from a voice user and a fax machine, and an application server configured for providing unified communications according to an embodiment of the present invention.

FIG. 1 is a diagram illustrating a voice over IP user interface system configured for initiating multiple messaging sessions for respective message types based on a received call, and selectively terminating nonrelevant messaging sessions, according to an embodiment of the present invention. The system 10 includes an IP telephony gateway 12, implemented for example using a Cisco AS5300 Universal Access Server, configured for establishing Real Time Protocol (RTP) data stream connections according to H.323 protocol for a calling party 14 dialing into an IP-based resource via the public switched telephone network 16, or a fax machine 15 dialing into the IP-based resource via the PSTN 16. The system 10 also includes an application server 18 (i.e., application server), for example an IP-based unified messaging system configured for establishing unified messaging sessions with the calling party 14. An exemplary implementation of the unified messaging system is the commercially available Cisco Unified Open Network Exchange (Cisco uOne) (Products UONE-FOUND 4.1S, and UONE-VOICEMSG4.1S) from Cisco Systems, Inc. The system 10 also includes a fax server 26 configured for receiving fax calls, described in further detail below. Hence, the application server 18 is configured for providing messaging sessions enabling calling parties to leave voice-type messages for messaging subscribers, whereas the fax server 26 is configured for enabling calling parties to leave fax type messages.

The application server 18 is configured for establishing H.323 calls with the IP telephony gateway 12 on a first interface 40 by exchanging call control and signaling commands across an H.225 call control channel 20. In particular, the application server 18 is implemented as an H.323 compliant software resource configured for executing selected user interface applications, for example a unified messaging system. The application server 18 also is configured for sending and receiving channel control messages on an H.245 media control channel 22 for setup and tear down of Real Time Protocol (RTP) media channels 24 configured for transmitting media streams according to a prescribed compression. The RTP media channel 24a supplies a first media stream (e.g., calling party audio data) from the gateway 12 to the application server 18, and the RTP media channel supplies a second media stream (e.g., audible prompts) to the gateway 12 for playback to the calling party.

The gateway 12, in response to receiving an incoming call, sends requests to the application server 18 and the fax server 26 to initiate respective messaging sessions for storage of a message according to the respective message types. As described in the background portion of the specification, the gateway 12 may not be able to detect for a number of seconds (e.g., about seven seconds) whether the incoming call is a voice message or a fax message. Hence, the gateway 12 concurrently initiates multiple messaging sessions according to the respective message types. The gateway 12 then sends a reject message according to H.225 protocol (e.g., a Release Complete Message), causing termination of the nonrelevant messaging sessions, upon determining the type of message being sent.

As described in further detail below with respect to FIGS. 2A and 2B, the application server 18 terminates the corresponding messaging session by rolling back (i.e., removing data) data structures to the pre-initiation state, ensuring that the initiation and early termination of the application sessions not corrupt any data. In particular, the application server 18 includes an asynchronous event manager 30 that is implemented as a persistent process executed within the application runtime environment of the application server 18. The asynchronous event manager 30 is configured for monitoring the presence of reject messages from the gateway 12. The asynchronous event manager 30, upon detecting an H.225 reject message that specifies a "Release Complete" having a Cause Information Element having a value of "25" (IE=25), and updates the corresponding global variables for the identified application session to cause the identified application session to be terminated by the application server 18.

Hence, multiple instances of application processes may be simultaneously initiated while the requester determines the optimum instance to be utilized for processing; once the optimum instance has been identified, the remaining instances can be sent a message by the requester to terminate after rolling back the necessary data structures.

Figure 2A:
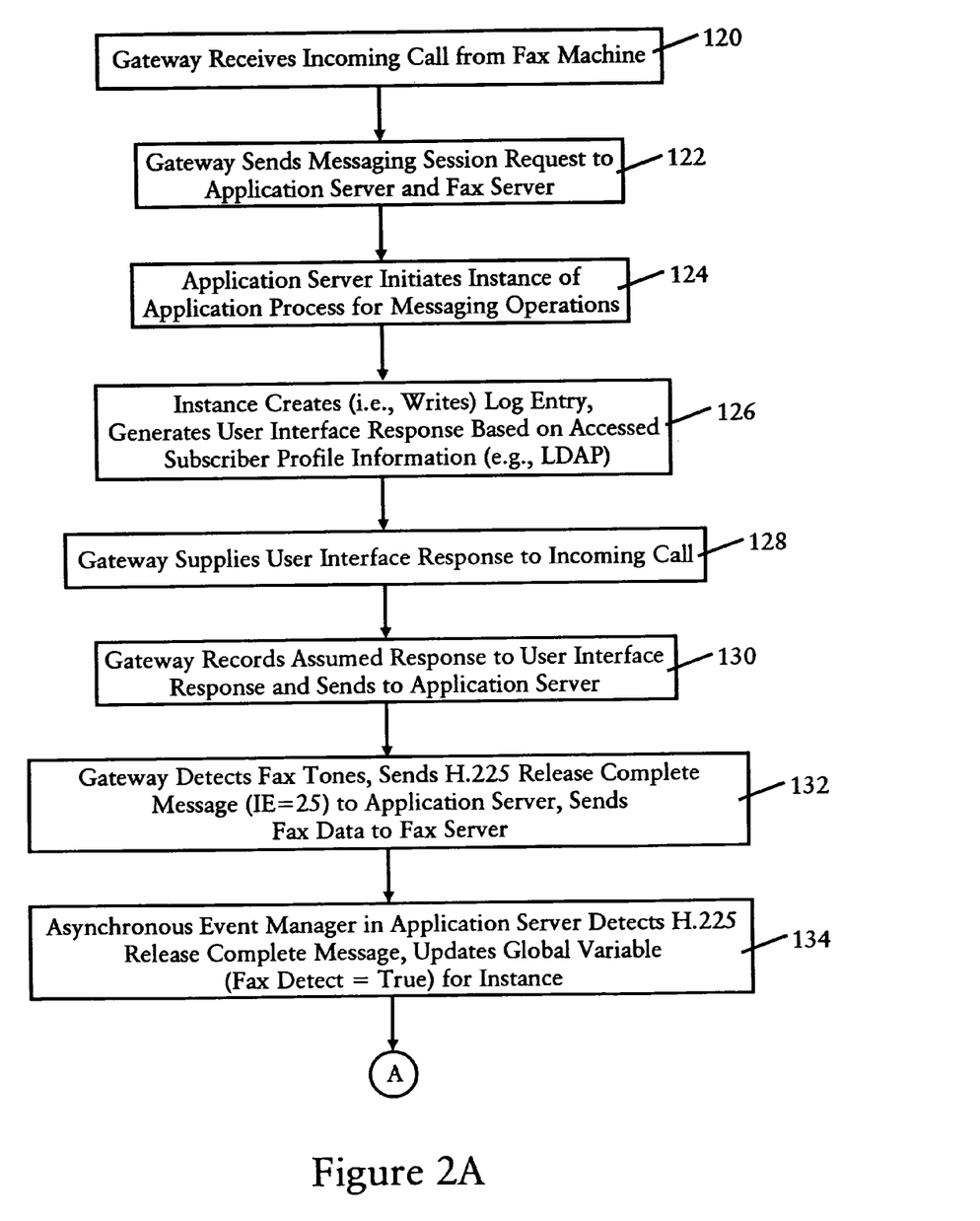
FIGS. 2A and 2B are diagrams summarizing the method of selectively terminating an instance of the application process based on reception of a reject message indicating an incompatible call type, according to an embodiment of the present invention.
Figure 2B:
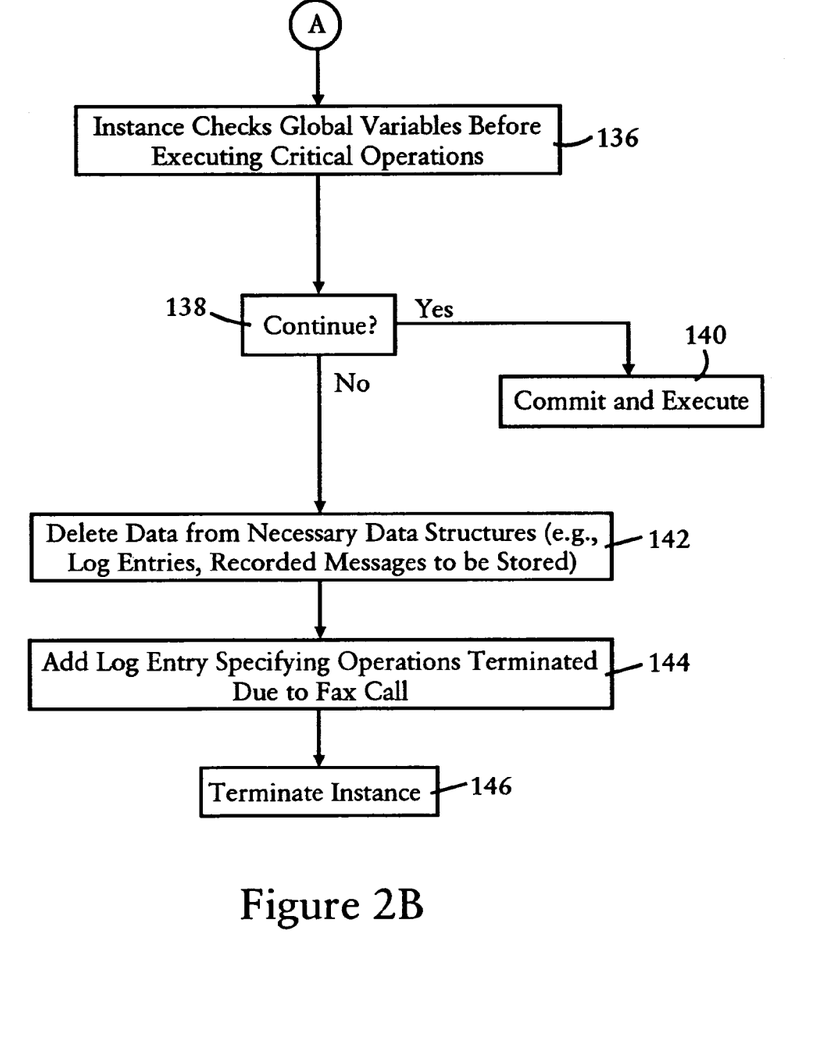
Figure 3:
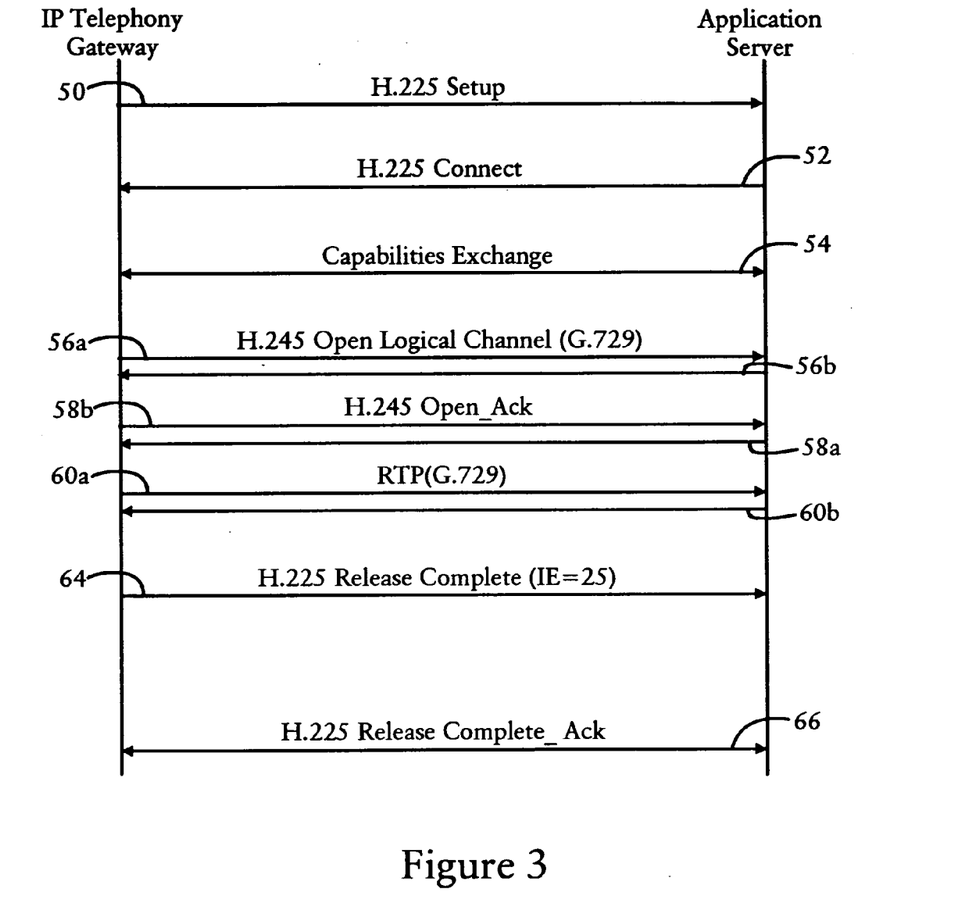
FIG. 3 is a diagram illustrating a call processing sequence for establishment of an RTP stream, followed by transmission by the voice over IP gateway of a reject message to the application server for selective termination of the messaging session according to an embodiment of the present invention.

FIGS. 2A and 2B are diagrams summarizing the method of selectively terminating an instance of the application process based on reception of a reject message indicating an incompatible call type, according to an embodiment of the present invention. The steps described in FIGS. 2A and 2B can be implemented as executable code stored on a computer readable medium (e.g., a hard disk drive, a floppy drive, a random access memory, a read only memory, an EPROM, a compact disc, etc.). FIG. 3 is a diagram illustrating a call processing sequence executed by the voice over IP gateway 12 and the application server 18 during execution of the method of FIGS. 2A and 2B.

As shown in FIG. 2A, the method begins in step 120, where the gateway 12 receives an incoming call from a fax machine 15. The gateway 12 sends in step 122 messaging session requests to the application server 18 and the fax server 26 for initiation of voice-type and fax-type messaging sessions, respectively. As shown in FIG. 3, the IP telephony gateway 12 implements step 122 by sending a setup message in step 50 to the application server 18 on the H.225 call control channel 20 in response to the incoming call. The application server 18 initiates an instance of an application process for messaging operations in step 124 in response to receiving the messaging session request. In particular, the application server 18 sends on the H.225 call control channel 20 a connect message back to the IP telephony gateway 12 in step 52. The IP telephony gateway 12 and the application server 18 then exchange capabilities information in step 54 to determine which codecs are available for use. The fax server 26 also initiates a fax-type messaging session in response to the corresponding messaging session request from the gateway 12 (not shown in FIG. 2A).

The instance created by the application server 18 creates in step 126 any necessary log entries or any other data structures (e.g., global variables and other variables that affect application state in the runtime environment), and generates a user interface response for the IP telephony gateway 12 based on accessed subscriber profile information, retrieved for example from the subscriber profile directory 88 according to LDAP protocol.

The user interface response is sent by the application server 18 to the IP telephony gateway 12 once the RTP connections have been established. In particular, the IP telephony gateway 12 and the application server 18 establish a two-way RTP connection as part of the initialization of the messaging session that includes the initial generation of the necessary data structures by the instance in step 126. The IP telephony gateway 12 and the application server 18 each send an open logical channel message to establish a corresponding RTP media channel 24 for full duplex communications. In particular, the IP telephony gateway 12 sends a logical channel open message in step 56*a* on the H.245 media control channel 22, and the application server 18 responds by sending an acknowledgment in step 58*a*, causing the IP telephony gateway 12 to open the media channel 24*a* in step 60*a* using for example the G.729 compression. The application server 18 also sends a logical channel open message in step 56*b* on the H.245 media control channel 22, and the IP telephony gateway 12 responds by sending an acknowledgment in step 58*b*, causing the application server 18 to open the media channel 24*b* in step 60*b* using the G.729 compression. At this point, the IP telephony gateway 12 and the application server 18 have established a full duplex, two-way RTP channel (24*a* and 24*b*) using preferred voice mail compression, such as G.729. The application server 18 sends the generated user interface response to the IP telephony gateway 12 via the RTP channel 24*b*.

Depending on the subscriber profile information, the instance may initiate a voice messaging session enabling a voice user to leave a message in an IMAP-based subscriber message store 32, or a single-number reach session enabling a calling party to reach the subscriber via prescribed subscriber devices based on the application server 18 calling the prescribed subscriber devices attempting to reach the subscriber. The instance alternately may initiate an autoplay session to begin automatic playback of stored voice messages. Any different types of application sessions may be implemented in step 126, since the emphasis is to illustrate that the application server 18 has initiated the messaging operations based on the assumption that the incoming call is a voice call.

This assumption of the incoming call being a voice call is further illustrated by the gateway 12 supplying in step 128 the user interface response to the incoming call, for example by playing a prompt, and possibly recording in step 130 an assumed response to the user interface response and sending the recording back to the application server 18. As apparent from the foregoing, the recording made by the gateway 12 in step 130 may include nothing but fax tones generated by the fax machine 15. Hence, conventional systems incapable of detecting fax tones may end up storing the recorded fax tones in a subscriber's voice mail inbox.

The disclosed embodiment, however, is configured for selectively terminating the nonrelevant application instances and removing data that may otherwise corrupt existing data structures, enabling multiple instances to be generated and later terminated without corrupting existing data structures. In particular, if the gateway 12 detects fax tones within a prescribed detection interval (e.g., 7 seconds) in step 132, the gateway 12 sends to the application server 18 a reject message, implemented for example as an H.225 Release Complete Message sent in step 64 specifying a prescribed Information Element value (IE=25). The gateway 12 continues to send the fax data to the fax server 26 by the corresponding connection 34.

As described above, the instance that is initiated by the application server 18 for execution of the voice messaging operations is state-dependent based on global variables that specify application state parameters. Hence, the application server 18 includes a persistent asynchronous event manager 30 configured for monitoring for the presence of the H.225 Release Complete message from the gateway 12.

The asynchronous event manager 30, in response to detecting in step 134 the H.225 Release Complete message, updates the global variable for the identified instance. The instance continues execution of the prescribed sequence of messaging operations until reaching a prescribed location in the prescribed sequence that requires checking in step 136 the global variables associated with the messaging session before committing to execution of critical operations that cannot easily be recovered. Examples of critical operations includes transmitting a message via SMTP, changing a status of stored messages in the IMAP subscriber message store 32, or initiating an outgoing call for a single number reach application.

If in step 138 the application instance determines that the global variable specified that no fax was detected (Fax Detect=False), the application instance continues to commit and execute the critical operations in step 140. However if in step 138 the application instance determines that the global variable specified that a fax was detected by the gateway 12 (Fax Detect=True), the application instance begins rollback and termination operations. Specifically, the application instance deletes in step 142 all relevant data from the necessary data structures, for example any log entries, and any recorded messages sent by the gateway 12 for storage in the subscriber message store 32. The application instance also adds in step 144 a log entry specifying that operations were terminated due to a fax call, enabling management agents to trace the relevant logs of the application server to properly identify that the application session was properly terminated. The application instance then acknowledges in step 66 the H.225 Release Complete message, enabling tear down of the two-way RTP media stream 24, and terminates itself in step 146.

According to the disclosed embodiment, multiple application instances can be simultaneously initiated for concurrent execution of application operations for a single event, where nonrelevant application instances can later be rolled back and terminated once the relevant application instances are identified. The disclosed arrangement is particularly effective for applications having antecedent steps that need to be performed before execution of critical operations, since additional information related to the critical operations can be obtained during the concurrent execution of the antecedent steps. For example, the disclosed arrangement may be applicable to billing verification processes that perform prescribed steps before execution of critical functions. The disclosed arrangement also may be effective for traffic management among multiple data paths, or even management of distributed processes across multiple platforms.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an application server, the method comprising:

receiving, by the application server, an initiation request from a gateway configured for receiving incoming Voice over IP calls, including receiving the initiation request via a Voice over IP call control channel between the application server and the gateway;

initiating by the application server an instance of an application process configured for executing a prescribed sequence of messaging operations for a first type of incoming message, in response to reception of the initiation request, the initiating including writing first data, having been received from the gateway via a Voice over IP media channel, into a first data structure that identifies information based on execution of the instance;

selectively setting by the application server a prescribed variable based on receiving a reject message from the gateway via the Voice over IP call control channel; and selectively terminating, by the application server, the instance prior to completing the sequence of messaging operations based on detecting, at a prescribed location in the prescribed sequence, the prescribed variable set during execution of the instance and that specifies the prescribed sequence of message operations are not to be performed based on the prescribed variable having been set to specify that the incoming message corresponds to a second message type incompatible with the first type, the selectively terminating including terminating execution of the operations subsequent to the prescribed location and removing the first data from the first data structure.

2. The method of claim 1, wherein the initiating includes executing the prescribed sequence of messaging operations for a voice message as the first type.

3. The method of claim 2, wherein the selectively terminating includes terminating the instance based on detecting that the prescribed variable, specifying a voice over IP protocol message, specifies a call rejected condition.

4. The method of claim 3, wherein the detecting includes identifying the incoming message as a facsimile message as said second message type.

5. The method of claim 1, wherein the removing includes deleting a recorded message as the first data from the first data structure.

6. The method of claim 5, wherein the selectively terminating further includes adding a log entry indicating deletion of the recorded message prior to storage within a subscriber message store, based on detecting that the prescribed variable specifies a detected difference between the first type and a detected type having been identified as said second message type.

7. The method of claim 6, wherein the first type corresponds to a voice message, the method further comprising setting the prescribed variable to not perform the prescribed sequence of message operations based on detecting that the incoming message is a fax message.

8. The method of claim 1, wherein the selectively terminating includes halting operations for transmission of a message, recorded during execution of the instance, into a subscriber message store.

9. The method of claim 1, further comprising selectively completing execution of the messaging operations, including transmission of a message recorded during execution of the instance, based on an absence of the prescribed variable being set upon the instance reaching the prescribed location in the prescribed sequence.

10. The method of claim 1, wherein the selectively setting includes:

receiving the reject message by a persistent asynchronous event manager process executed by the application server; and setting the prescribed variable by the persistent asynchronous event manager process, in response to the reject message, prior to the prescribed location in the prescribed sequence.

11. A method in a communications system having a gateway configured for receiving incoming calls and an application server, the method comprising:

sending a request by the gateway to the application server for initiating a messaging session according to a first message type in response to receiving an incoming Voice over IP call;

initiating by the application server an instance of an application process configured for executing a prescribed sequence of messaging operations for generation of the messaging session, including writing first data into a first data structure that identifies information based on execution of the instance;

detecting by the gateway, following sending the request, that the incoming Voice over IP call corresponds to a second message type incompatible with the first message type and in response sending a reject message to the application server; and terminating the instance, prior to completion of executing the prescribed sequence of messaging operations by the application server in response to the reject message, including removing the first data from the first data structure.

12. The method of claim 11, wherein the sending includes sending a second request, concurrently with sending the request for initiating the messaging session according to the first message type, for initiation of a messaging session according to the second message type in response to receiving the incoming Voice over IP call.

13. The method of claim 12, wherein the sending of the second request includes outputting the second request to a server configured for initiating the messaging session according to the second message type.

14. The method of claim 13, wherein the first message type corresponds to a voice message, and the second message type corresponds to a fax message, the sending of a reject message including specifying a voice over IP protocol call rejected message.

15. The method of claim 11, wherein the removing includes deleting a recorded message as the first data from the first data structure prior to storage in a subscriber message store.

16. The method of claim 11, further comprising:

detecting the reject message by a persistent asynchronous event manager process executed by the application server; and setting a prescribed variable by the persistent asynchronous event manager process and that indicates the prescribed sequence of messaging operations should not be completed, in response to the detection of the reject message and prior to a prescribed location in the prescribed sequence;

the terminating including detecting, by the instance at the prescribed location in the prescribed sequence, the prescribed variable set to indicate the prescribed sequence of messaging operations should not be completed, and in response removing the first data from the first data structure and terminating the operations of the prescribed sequence subsequent to the prescribed location.

17. A communications system comprising:
a gateway configured for receiving an incoming Voice over IP call and in response sending first and second requests for concurrent initiation of messaging sessions according to respective first and second message types, the gateway configured for generating a reject message in response to detecting that the incoming Voice over IP call corresponds to the second message type incompatible with the first message type; and
an application server configured for initiating, in response to the first request, an instance of an application process configured for executing a prescribed sequence of messaging operations for generation of the messaging session according to the first message type, the application server configured for writing first data into a first data structure that identifies information based on execution of the instance, the application server having an asynchronous event manager configured for causing termination of the instance, including removal of the first data from the data structure, prior to completion of executing the prescribed sequence of messaging operations, in response to reception of the reject message.

18. The system of claim 17, further comprising a second server configured for initiating the messaging session according to the second message type in response to reception of the second request, the second server configured for receiving a fax message as the second message type.

19. The system of claim 17, wherein the asynchronous event manager is configured for causing removal of a recorded message as the first data from the data structure, prior to storage in a subscriber message store, in response to reception of the reject message.

20. The system of claim 18, wherein the gateway is configured for generating the reject message to specify a voice over IP protocol message.

21. The system of claim 17, wherein the gateway is configured for sending the first and second requests concurrently for the respective messaging sessions to be executed concurrently.

22. The system of claim 17, wherein the asynchronous event manager is a persistent application instance executed by the application server.

23. A computer readable medium having stored thereon sequences of instructions for an application server to execute a messaging session, the sequences of instructions including instructions for performing the steps of:
receiving, by the application server, an initiation request from a gateway configured for receiving incoming Voice over IP calls, including receiving the initiation request via a Voice over IP call control channel between the application server and the gateway;
initiating by the application server an instance of an application process configured for executing a prescribed sequence of messaging operations for a first type of incoming message, in response to reception of the initiation request, the initiating step including writing first data, having been received from the gateway via a Voice over IP media channel, into a first data structure that identifies information based on execution of the instance;
selectively setting by the application server a prescribed variable based on receiving a reject message from the gateway via the Voice over IP call control channel; and
selectively terminating, by the application server, the instance prior to completing the sequence of messaging operations based on detecting, at a prescribed location in the prescribed sequence, the prescribed variable set during execution of the instance and that specifies the prescribed sequence of message operations are not to be performed based on the prescribed variable having been set to specify that the incoming message corresponds to a second message type incompatible with the first type, the selectively terminating step including terminating execution of the operations subsequent to the prescribed location and removing the first data from the first data structure.

24. The medium of claim 23, wherein the initiating step includes executing the prescribed sequence of messaging operations for a voice message as the first type.

25. The medium of claim 24, wherein the selectively terminating step includes terminating the instance based on detecting that the prescribed variable, specifying a voice over IP protocol message, specifies a call rejected condition.

26. The medium of claim 25, wherein the detecting includes identifying the incoming message as a facsimile message as said second message type.

27. The medium of claim 23, wherein the removing step includes deleting a recorded message as the first data from the first data structure.

28. The medium of claim 27, wherein the selectively terminating step further includes adding a log entry indicating deletion of the recorded message prior to storage within a subscriber message store, based on detecting that the prescribed variable specifies a detected difference between the first type and a detected type having been identified as said second message type.

29. The medium of claim 28, wherein the first type corresponds to a voice message, the method further comprising setting the prescribed variable to not perform the prescribed sequence of message operations based on detecting that the incoming message is a fax message.

30. The medium of claim 23, wherein the selectively terminating step includes halting operations for transmission of a message, recorded during execution of the instance, into a subscriber message store.

31. The medium of claim 23, further comprising instructions for performing the step of selectively completing execution of the messaging operations, including transmission of a message recorded during execution of the instance, based on an absence of the prescribed variable being set upon the instance reaching the prescribed location in the prescribed sequence.

32. An application server for executing a messaging application, the application server including:
means for receiving an initiation request and first data from a gateway configured for receiving incoming Voice over IP calls, the means for receiving configured for receiving the initiation request via a Voice over IP call control channel between the application server and the gateway, and the first data via a Voice over IP media channel between the application server and the gateway;
means for initiating an instance of an application process configured for executing a prescribed sequence of messaging operations for a first type of incoming message, in response to reception of the initiation request by the means for receiving of the application server, the means for initiating configured for writing the first data into a first data structure that identifies information based on execution of the instance; and means for selectively setting a prescribed variable based on the application server receiving a reject message from the gateway via the Voice over IP call control channel;

the means for initiating selectively terminating the instance prior to completing the sequence of messaging operations based on detecting, at a prescribed location in the prescribed sequence, the prescribed variable set during execution of the instance and that specifies the prescribed sequence of message operations are not to be performed based on the prescribed variable having been set to specify that the incoming message corresponds to a second message type incompatible with the first type, the means for initiating terminating execution of the operations subsequent to the prescribed location and removing the first data from the first data structure, based on the prescribed variable set.

33. The server of claim 32, wherein the means for initiating is configured for executing the prescribed sequence of messaging operations for a voice message as the first type.

34. The server of claim 33, wherein the means for initiating is configured for terminating the instance based on detecting that the prescribed variable, specifying a voice over IP protocol message, specifies a call rejected condition.

35. The server of claim 34, wherein the selectively setting means is configured for identifying the incoming message as a facsimile message.

36. The server of claim 32, wherein the means for initiating is configured for deleting a recorded message as the first data from the first data structure.

37. The server of claim 36, wherein the means for initiating is configured for adding a log entry indicating deletion of the recorded message prior to storage within a subscriber message store, based on detecting that the prescribed variable specifies a detected difference between the first type and a detected type having been identified as said second message type.

38. The server of claim 32, wherein the means for initiating is configured for halting operations for transmission of a message, recorded during execution of the instance, into a subscriber message store.

39. The server of claim 32, wherein the means for initiating is configured for selectively completing execution of the messaging operations, including transmission of a message recorded during execution of the instance, based on an absence of the prescribed variable being set upon the instance reaching the prescribed location in the prescribed sequence.

40. An application server comprising:
an interface configured for receiving messages from a gateway configured for receiving incoming Voice over IP calls, the gateway configured for outputting a first request for initiating a messaging session according to a first message type in response to receiving an incoming Voice over IP call, the gateway also configured for outputting a reject message in response to detecting that the incoming Voice over IP call corresponds to a second message type incompatible with the first message type; and an application runtime environment configured for initiating an instance of an application process, configured for executing a prescribed sequence of messaging operations for the first type of incoming message, in response to reception of the first request, the instance writing first data into a first data structure that identifies information based on execution of the instance, the application runtime environment including an asynchronous event manager configured for selectively causing termination of the instance prior to completing the sequence of messaging operations based on detecting the reject message, by a prescribed location in the prescribed sequence, specifies that the incoming message corresponds to the second message type, the asynchronous event manager causing termination of execution of the operations subsequent to the prescribed location and removal of the first data from the first data structure.

41. The server of claim 40, wherein the asynchronous event manager is configured for causing removal of a recorded message as the first data from the data structure, prior to storage thereof in a subscriber message store, in response to reception of the reject message.

42. The server of claim 41, wherein the instance is configured for generating a log entry indicating termination of the instance based on reception of the reject message.

43. The server of claim 41, wherein the first message type corresponds to a voice message and the second message type corresponds to a fax message, the reject message including a voice over IP protocol call rejected message.

44. A communications system comprising:
gateway means for receiving an incoming Voice over IP call and in response sending first and second requests for initiation of concurrent messaging sessions according to respective first and second message types, the gateway means configured for generating a reject message in response to detecting that the incoming Voice over IP call corresponds to the second message type incompatible with the first message type; and application server means for initiating, in response to the first request, an instance of an application process configured for executing a prescribed sequence of messaging operations for generation of the messaging session according to the first message type, the application server means configured for writing first data into a first data structure that identifies information based on execution of the instance, the application server means having an asynchronous event monitoring means configured for causing termination of the instance, including removal of the first data from the data structure, prior to completion of executing the prescribed sequence of messaging operations, in response to reception of the reject message.

* * * * *